June 21, 1938.  G. BECK  2,121,279
TROLLING BALLAST
Filed Dec. 27, 1937
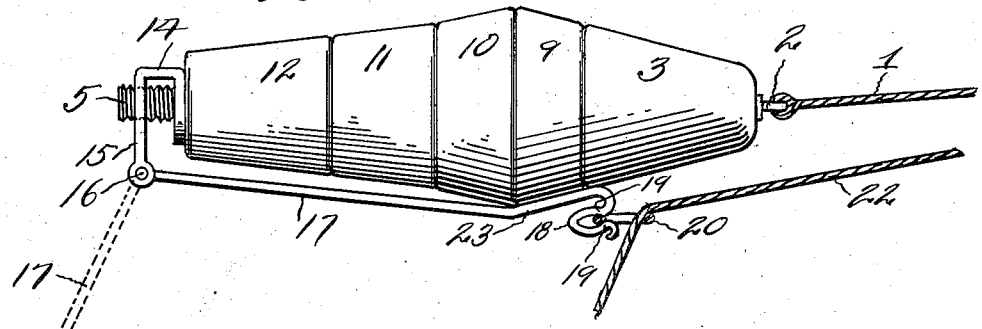
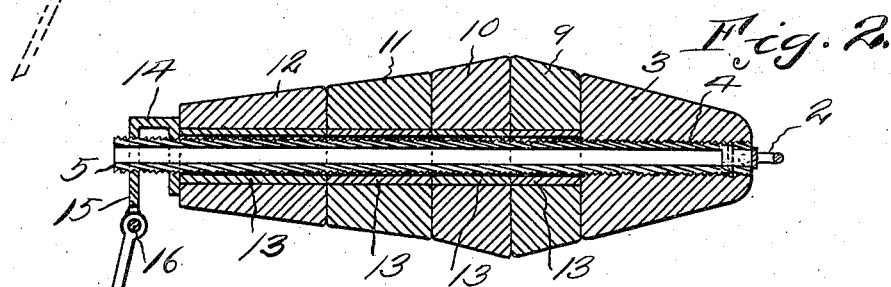
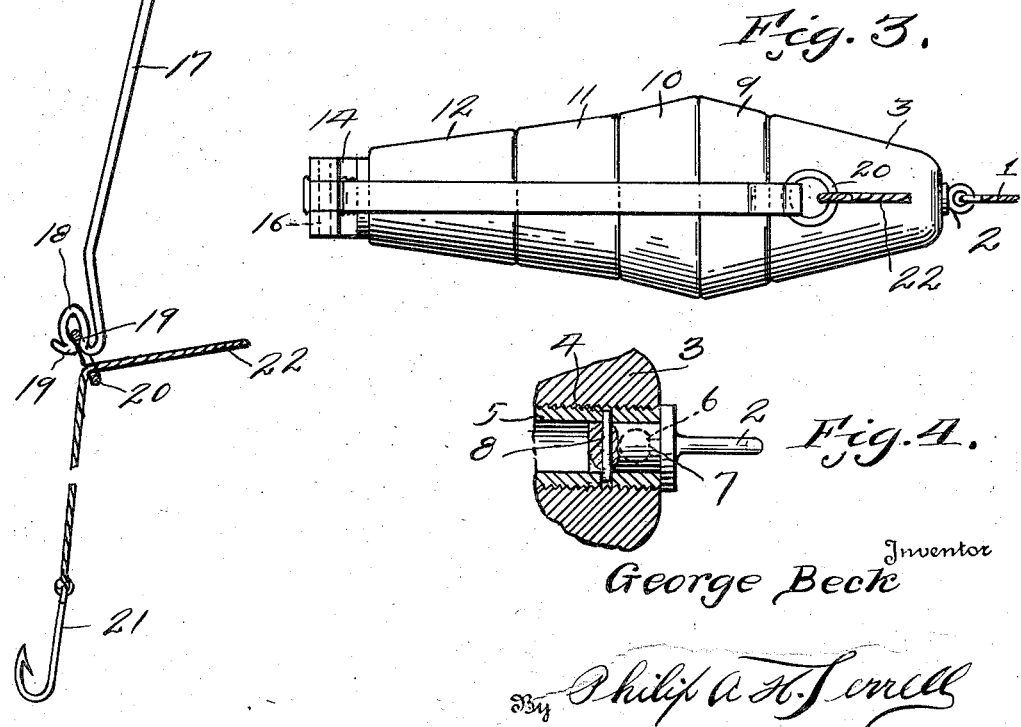
Inventor
George Beck
By Philip A. H. Sewell
Attorney Patented June 21, 1938

2,121,279

UNITED STATES PATENT OFFICE 2,121,279

TROLLING BALLAST

George Beck, Irvington, N. J.

Application December 27, 1937, Serial No. 181,960

6 Claims. (Cl. 43—52)

The invention relates to means for supporting, detachably, a fishing line during a trolling operation, and has for its object to provide a weighted member, adapted to be towed in a submerged position to the rear of a boat, and to detachably support a line for fishing purposes and hold said line submerged during the trolling operation. The detachable supporting formed means whereby upon the catching of a fish, the line will be detached from the weighted member so the operator can haul in the fish to the boat.

A further object is to provide the weighted member with a pivoted arm having a frictional holding means at its free end for the reception of a member through which the fishing line extends, whereby upon the catching of the fish the member will be forced from the frictional holding means for allowing the fish to be hauled in independently of the weighted member, thereby obviating the hauling in of the weighted member against the water pressure along with the fish.

A further object is to hingedly mount the arm, adjacent the rear end of the weighted member and below the weighted member, so its free end, during the pulling in of the line, will engage the under side of the weighted member and be stopped thereby whereby the continued pulling on the line will detach the ring and line from the arm, for instance if the fish is light or the ring should not quickly release when the fish bites.

A further object is to form the weighted member from a plurality of sections held together by a tube on which the weighted members are mounted, and a member threaded on the tube at the rear end thereof for holding the sections in assembled position, and for supporting the pivoted arm.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a side elevation of the weighted member showing the pivoted arm in raised position.

Figure 2 is a vertical longitudinal sectional view through the weight member showing the same in position for supporting a line during a fishing operation.

Figure 3 is a bottom plan view of the device.

Figure 4 is an enlarged longitudinal sectional view through the forward end of the weight member.

Referring to the drawing, the numeral 1 designates a towing line, one end of which is adapted to be attached to a boat for towing purposes, and the other connected to a swivel eye 2, carried by the forward end of the weight member. The weight member comprises a forward portion 3 formed of lead or other material, and which portion is preferably cast at 4 on the forward end of the threaded tube 5. The swivelled eye 2 is pivotally mounted at 6 in a cylindrical member 7, which extends into the tube 5 and secured therein by means of a transverse pin 8 as clearly shown in Figure 4. Disposed on the tubular member 5 is a plurality of weight members 9, 10, 11 and 12, which weight members are provided with internal sleeves 13, preferably cast therein. It will be noted that the sections 9, 10, 11 and 12 are assembled on the rear end of the threaded tube, and by making them removable, they can be removed and replaced by different weight members, according to the amount of weight desired. Threaded on the rear end of the tube 5 is a bracket 14, which engages the rear end of the weight section 12 and holds the parts in assembled relation. Bracket 14 is provided with a downwardly extending arm 15, to the lower end of which is pivotally connected at 16 a line supporting arm 17. The lower end of the arm 17 terminates in a ring gripping member 18 having cooperating jaws 19 for holding the line supporting ring 20 frictionally so that upon a pull on the hook 21 by a fish the ring 20 will be pulled from between the jaws 19 and then the fisherman may, through the medium of the line 22, pull the fish into the boat without the necessity of pulling the weight member along with the fish. At the same time the weight member maintains the line 22 submerged, hence the line will not float to the surface of the water as now experienced in trolling operations.

After the fish has been pulled into the boat the weight member is also drawn into the boat and the ring 20 again placed in the holding member 13 and the next trolling operation takes place.

Referring to Figure 1, it will be noted that the line supporting arm 17 is in raised position for the detaching operation, hence it will be seen that where the ring 20 does not quickly detach upon the biting by the fish the continued pull on the line 22 will cause the angle portion 23 of the arm 17 to come into engagement with the under side of the weight body, and to be rigidly held thereby incident to the water pressure on the weight body, consequently the ring 20 will be pulled from between the jaws 19 for the releasing operation.

From the above it will be seen that a trolling device is provided for supporting a fishing line and maintaining the same submerged during a fishing operation, and the resistance of the weight member while being dragged through the water is utilized for assisting the line detaching operation. It will also be seen that the weight member is built up from a plurality of weight sections detachably mounted, thereby allowing the weight of the device to be varied according to trolling conditions and according to the depth of the trolling operation desired.

The invention having been set forth what is claimed as new and useful is:

1. A trolling device for supporting a fishing line and maintaining the same submerged, said device comprising a weighted body, means for towing said weighted body to the rear of a boat and means carried by the weighted body and directly cooperating with a fishing line for detachably holding and supporting said fishing line.

2. A trolling device adapted to be towed to the rear of a boat in a submerged position, said device comprising a weighted body, a pivoted arm carried by said body at its rear end, and means carried by said pivoted arm for frictionally holding and supporting a fishing line.

3. A trolling device adapted to be towed to the rear of a boat in a submerged position, said trolling device comprising a weighted body, means for attaching a towing line to said weighted body for dragging the same through the water in a submerged position, a bracket carried by the rear end of said body, a line supported hinged arm carried by the bracket and adapted to swing upwardly into engagement with the body, and frictional gripping means carried by said arm and adapted to frictionally hold and support a fishing line.

4. A device as set forth in claim 3 wherein the body is formed from a plurality of detachable weight sections, said bracket forming means for maintaining said weight sections assembled.

5. A device as set forth in claim 3 wherein the body comprises a head section, a tube carried by said head section and extending rearwardly, and a plurality of weight sections mounted on said tube, said arm supporting bracket being threaded on the tube and engaging the rear weight section for holding said sections together.

6. A device as set forth in claim 3 wherein the body comprises a head section, a tube on which said head section is anchored, a tow line pivot member in the forward end of the tube, said tube being threaded, a plurality of weight sections telescopically mounted on the tube and removable therefrom, and sleeves carried by said plurality of sections and surrounding the tube, said arm supporting bracket being threaded on the rear end of the tube and cooperating with the plurality of weight sections for forcing them towards the head section.

GEORGE BECK.